United States Patent
Cune et al.

(10) Patent No.: US 10,601,511 B2
(45) Date of Patent: *Mar. 24, 2020

(54) PROVIDING SIMULTANEOUS DIGITAL AND ANALOG SERVICES AND OPTICAL FIBER-BASED DISTRIBUTED ANTENNA SYSTEMS, AND RELATED COMPONENTS AND METHODS

(71) Applicant: Corning Optical Communications LLC, Charlotte, NC (US)

(72) Inventors: William Patrick Cune, Charlotte, NC (US); Ofer Saban, Vienna, VA (US); Isaac Shapira, Petach Tikva (IL)

(73) Assignee: Corning Optical Communications LLC, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/000,029

(22) Filed: Jun. 5, 2018

(65) Prior Publication Data
US 2018/0287704 A1 Oct. 4, 2018

Related U.S. Application Data

(63) Continuation of application No. 15/437,122, filed on Feb. 20, 2017, now Pat. No. 10,014,945, which is a
(Continued)

(51) Int. Cl.
*H04B 10/2575* (2013.01)
*H04J 14/02* (2006.01)
(Continued)

(52) U.S. Cl.
CPC . *H04B 10/25753* (2013.01); *H04B 10/25752* (2013.01); *H04J 14/0246* (2013.01);
(Continued)

(58) Field of Classification Search
CPC .................................................. H04J 14/0246
See application file for complete search history.

(56) References Cited

U.S. PATENT DOCUMENTS 7,035,671 B2 4/2006 Solum
7,627,250 B2 12/2009 George et al.
(Continued)

FOREIGN PATENT DOCUMENTS

WO 2012072626 A1 6/2012
WO 2014048866 A1 4/2014

OTHER PUBLICATIONS

EP Rule 161 dated Dec. 16, 2015 5 pages.
(Continued)

*Primary Examiner* — Nathan M Cors
(74) *Attorney, Agent, or Firm* — C. Keith Montgomery

(57) ABSTRACT

Embodiments relate to providing simultaneous digital and analog services in optical fiber-based distributed radio frequency (RF) antenna systems (DASs), and related components and methods. A multiplex switch unit associated with a head-end unit of a DAS can be configured to receive a plurality of analog and digital downlink signals from one or more sources, such as a service matrix unit, and to assign each downlink signal to be transmitted to one or more remote units of the DAS. In one example, when two or more downlink signals are assigned to be transmitted to the same remote unit, a wave division multiplexer/demultiplexer associated with the multiplex switch unit can be configured to wave division multiplex the component downlink signals into a combined downlink signal for remote side transmission and to demultiplex received combined uplink signals into their component uplink signals for head-end side transmission.

20 Claims, 8 Drawing Sheets

Related U.S. Application Data continuation of application No. 14/823,304, filed on Aug. 11, 2015, now Pat. No. 9,602,898, which is a continuation of application No. PCT/US2014/017660, filed on Feb. 21, 2014.

(60) Provisional application No. 61/769,820, filed on Feb. 27, 2013.

(51) Int. Cl.
*H04Q 11/00* (2006.01)
*H04W 88/08* (2009.01)

(52) U.S. Cl.
CPC ...... *H04J 14/0249* (2013.01); *H04J 14/0252* (2013.01); *H04Q 11/0005* (2013.01); *H04Q 11/0067* (2013.01); *H04Q 11/0071* (2013.01); *H04Q 2011/0016* (2013.01); *H04Q 2011/0086* (2013.01); *H04W 88/085* (2013.01)

(56) References Cited

U.S. PATENT DOCUMENTS

| | | | |
|---|---|---|---|
| 7,848,770 B2 | 12/2010 | Scheinert | |
| 8,548,330 B2 | 10/2013 | Berlin et al. | |
| 9,338,823 B2 | 5/2016 | Saban et al. | |
| 9,602,898 B2* | 3/2017 | Cune | H04B 10/25752 |
| 10,014,945 B2* | 7/2018 | Cune | H04B 10/25752 |
| 2006/0133804 A1* | 6/2006 | Boduch | H04J 14/0227 |
| | | | 398/5 |
| 2007/0286599 A1 | 12/2007 | Sauer et al. | |
| 2010/0093391 A1 | 4/2010 | Saban et al. | |
| 2011/0268446 A1* | 11/2011 | Cune | H04B 10/25753 |
| | | | 398/79 |
| 2011/0268449 A1 | 11/2011 | Berlin et al. | |
| 2011/0268452 A1 | 11/2011 | Beamon et al. | |
| 2012/0148249 A1* | 6/2012 | Hahm | H04J 14/0232 |
| | | | 398/66 |
| 2014/0024402 A1 | 1/2014 | Singh | |

OTHER PUBLICATIONS

International Search Report and Written Opinion PCT/US2014/017660 dated Jun. 18, 2014.
Author Unknown, "4200 ROADM: DWR, OCM and Amplifiers for the 4200 RS 17-slot Advanced Services Platform," Product Data Sheet, 2011, Ciena Corporation, 3 pages.
International Preliminary Report on Patentability for PCT/US2014/017660, dated Sep. 11, 2015, 9 pages.
Examination Report for European Patent Application No. 14710430.1, dated Nov. 27, 2018, 6 pages.
Non-Final Office Action for U.S. Appl. No. 14/823,304, dated Jun. 30, 2016, 13 pages.
Non-Final Office Action for U.S. Appl. No. 15/437,122, dated Aug. 21, 2017, 13 pages.
Final Office Action for U.S. Appl. No. 15/437,122, dated Dec. 8, 2017, 12 pages.

* cited by examiner

| 138 | 140 | 142 | 144 | 146 | 52 | |
|---|---|---|---|---|---|---|
| Frequency Band | Technology | Provider | Interface | Service Matrix Unit | |
| 700 MHz (upper C) | LTE | Provider 1 | Analog | 1 (Provider 1) | } 52(1) |
| 850 MHz (CELL) | CDMA | Provider 1 | Analog | 1 (Provider 1) | |
| 1900 MHz (PCS) | CDMA | Provider 1 | Analog | 1 (Provider 1) | |
| 700 MHz (lower ABC) | LTE | Provider 2 | Digital | 2 (Provider 2) | } 52(2) |
| 850 MHz (CELL) | WCDMA | Provider 2 | Analog | 2 (Provider 2) | |
| 1900 MHz (PCS) | WCDMA | Provider 2 | Digital | 2 (Provider 2) | |
| 1700/2100 (AWS) | WCDMA | Provider 2 | Analog | 2 (Provider 2) | |
| 800 MHz (SMR) | CDMA | Provider 3 | Analog | 3 (Provider 3) | } 52(3) |
| 1900 MHz (PCS) | CDMA | Provider 3 | Analog | 3 (Provider 3) | |
| 1700/2100 (AWS) | LTE | Provider 4 | Digital | 4 (Provider 4 + Other) | } 52(4) |
| 700 MHz (Public Safety) | LTE | Government | Analog | 4 (Provider 4 + Other) | |
| 2.4 GHz | WiFi | Local | Digital | 4 (Provider 4 + Other) | |

*FIG. 5A*

| 138' | 140 | 142 | 144 | 146 | 52 | |
|---|---|---|---|---|---|---|
| Frequency Band | Technology | Provider | Interface | Service Matrix Unit | |
| 700 MHz (upper C) | LTE | Provider 1 | Analog | 5 (LTE) | } 52(5) |
| 700 MHz (lower ABC) | LTE | Provider 2 | Digital | 5 (LTE) | |
| 1700/2100 (AWS) | LTE | Provider 4 | Digital | 5 (LTE) | |
| 700 MHz (Public Safety) | LTE | Government | Analog | 5 (LTE) | |
| 800 MHz (SMR) | CDMA | Provider 3 | Analog | 6 (CDMA) | } 52(6) |
| 850 MHz (CELL) | CDMA | Provider 1 | Analog | 6 (CDMA) | |
| 1900 MHz (PCS) | CDMA | Provider 3 | Analog | 6 (CDMA) | |
| 1900 MHz (PCS) | CDMA | Provider 1 | Analog | 6 (CDMA) | |
| 850 MHz (CELL) | WCDMA | Provider 2 | Analog | 7 (WCDMA) | } 52(7) |
| 1900 MHz (PCS) | WCDMA | Provider 2 | Digital | 7 (WCDMA) | |
| 1700/2100 (AWS) | WCDMA | Provider 2 | Analog | 7 (WCDMA) | |
| 2.4 GHz | WiFi | Local | Digital | 8 (Other) | 52(8) |

*FIG. 5B*

PROVIDING SIMULTANEOUS DIGITAL AND ANALOG SERVICES AND OPTICAL FIBER-BASED DISTRIBUTED ANTENNA SYSTEMS, AND RELATED COMPONENTS AND METHODS

PRIORITY APPLICATION

This application is a continuation of U.S. application Ser. No. 15/437,122, filed, Feb. 20, 2017, which is a continuation of U.S. application Ser. No. 14/823,304, filed Aug. 11, 2015, now U.S. Pat. No. 9,602,898, which is a continuation of International Application No. PCT/US14/17660, filed on Feb. 21, 2014, which claims the benefit of priority to U.S. Provisional Application No. 61/769,820, filed on Feb. 27, 2013, all of which are incorporated herein by reference.

BACKGROUND

Field of the Disclosure

The technology of the disclosure relates to optical fiber-based distributed antenna systems (DASs) for distributing radio frequencies (RFs) and other signals over optical fibers.

Technical Background

Wireless communications are rapidly growing, with ever-increasing demands for high-speed mobile data communications. As an example, so-called "wireless fidelity," or "WiFi" systems and wireless local area networks (WLANs), are being deployed in many different areas. Distributed antenna systems (DASs) communicate with wireless devices called "clients," which must reside within a wireless range or "cell coverage area" of the DAS in order to communicate with an access point device. DASs can include analog and digital communications protocols and signals.

One approach to deploying a DAS involves the use of radio frequency (RF) antenna coverage areas. Antenna coverage areas can have a radius in a range from a few meters up to twenty meters, as an example. Combining a number of access point devices creates an array of antenna coverage areas. Because the antenna coverage areas each cover small areas, there are typically only a few users (clients) per antenna coverage area. This allows for minimizing the amount of RF bandwidth shared among the users of a wireless system. It may be desirable to provide antenna coverage areas in a building or other facility to provide DAS access to clients within the building or facility. However, it may be desirable to employ optical fibers to distribute communications signals. Benefits of employing optical fibers include increased bandwidth.

One type of DAS, called "Radio-over-Fiber" or "RoF," utilizes RF signals sent over optical fibers to create antenna coverage areas. Such systems can include a head-end unit (HEU) optically coupled to a plurality of remote units (RUs) that each provide antenna coverage areas. The plurality of RUs can each include RF transceivers coupled to an antenna to transmit RF signals wirelessly, wherein the plurality of RUs are coupled to the HEU via optical fiber links. The RF transceivers in the plurality of RUs are transparent to the RF signals. The plurality of RUs convert incoming optical RF signals from an optical fiber downlink to electrical RF signals via optical-to-electrical (O/E) converters, which are then passed to the RF transceivers. The RF transceivers convert the electrical RF signals to electromagnetic signals via antennas coupled to the RF transceivers provided in the plurality of RUs. The antennas also receive electromagnetic signals (i.e., electromagnetic radiation) from clients in the antenna coverage area and convert them to electrical RF signals (i.e., electrical RF signals in wire). The plurality of RUs then convert the electrical RF signals to optical RF signals via electrical-to-optical (E/O) converters. The optical RF signals are then sent over an optical fiber uplink to the HEU.

Design, installation, and subsequent modification of DASs present significant challenges, including limited expansion and scaling capabilities, and limitations regarding compatible technology protocols. These problems are exacerbated when a DAS is intended to provide both analog and digital communications and data signals across the system. For example, many conventional solutions require providing multiple optical and electrical cable connections between a HEU and each RU of a DAS. Thus, expanding bandwidth and a number of channels between the HEU and RUs can require extensive redesign and routing of additional optical and electrical cables throughout the system. Accordingly, a DAS and related components that permit scalability and compatibility with a wide array of different technologies, without extensive reconfiguration of the entire system, may be desirable.

SUMMARY OF THE DETAILED DESCRIPTION

Embodiments related to providing simultaneous digital and analog services in optical fiber-based distributed antenna systems (DASs), and related components and methods are disclosed. A multiplex switch unit associated with a head-end unit of a DAS can be configured to receive a plurality of analog and digital signals from one or more sources, such as a service matrix unit. The multiplex switch unit can be further configured to assign each signal to be transmitted to one or more remote units of the DAS. In one example, when two or more signals are assigned to be transmitted to the same remote unit, a wave division multiplexer/demultiplexer associated with the multiplex switch unit can wave division multiplex component downlink signals into a combined downlink signal for remote side transmission, and to demultiplex received combined uplink signals into their component uplink signals for head-end side transmission. Likewise, each remote unit may also include a wave division multiplexer/demultiplexer to separate a received combined downlink signal into individual component downlink signals, and to send received component uplink signals back to the head-end unit as one or more combined uplink signals. In this manner, existing optical fiber networks can be utilized for carrying both analog and digital communications on common optical fibers, and the amount and types of services provided at each remote unit can be individually configured, expanded, or modified to meet demand over time.

In this regard, in one embodiment, a multiplex switch unit for a DAS comprises a plurality of head-end side inputs configured to receive a plurality of component downlink signals comprising at least one downlink radio frequency (RF) communication signal and at least one downlink digital data (DD) signal. The multiplex switch unit also comprises a plurality of remote side optical outputs each configured to transmit at least one optical downlink signal. The multiplex switch unit also comprises a switch connected between the plurality of head-end side inputs and the plurality of remote side optical outputs. The switch is configured to assign each component downlink signal received from the plurality of head-end side inputs to at least one remote side optical output, including assigning at least one downlink RF communication signal and at least one downlink DD signal to a common remote side optical output. For each remote side optical output, the switch is configured to multiplex the respective assigned component downlink signals into a combined downlink optical signal, and transmit the respective combined downlink optical signal to the respective assigned at least one remote side optical output.

In another exemplary embodiment, a method of operating a multiplex switch unit for a DAS comprises receiving, at a plurality of head-end side inputs of the multiplex switch unit, a plurality of component downlink signals comprising at least one downlink RF communication signal and at least one downlink DD signal. The method further comprises assigning each component downlink signal received at the plurality of head-end side inputs to at least one of a plurality of remote side optical outputs of the multiplex switch unit, including assigning at least one downlink RF communication signal and at least one downlink DD signal to a common remote side optical output. The method also comprises, for each remote side optical output, multiplexing the respective assigned component downlink signals into a combined downlink optical signal, and transmitting the respective combined downlink optical signal to the assigned at least one remote side optical output.

In another exemplary embodiment, a non-transitory computer readable medium comprises instructions for directing a processor to perform a method. The method comprises receiving, at a plurality of head-end side inputs of a multiplex switch unit in a DAS, a plurality of component downlink signals comprising at least one downlink RF communication signal and at least one downlink DD signal. The method further comprises assigning each component downlink signal received at the plurality of head-end side inputs to at least one of a plurality of remote side optical outputs of the multiplex switch unit, including assigning at least one downlink RF communication signal and at least one downlink DD signal to a common remote side optical output. The method also comprises, for each remote side optical output, multiplexing the respective assigned component downlink signals into a combined optical downlink signal, and transmitting the respective combined downlink optical signal to the assigned at least one remote side optical output.

In another exemplary embodiment, a DAS comprises a head-end unit including a multiplex switch unit and a plurality of remote units. The multiplex switch unit comprises a plurality of head-end side inputs configured to receive a plurality of component downlink signals comprising at least one downlink RF communication signal and at least one downlink DD signal. The multiplex switch unit also comprises a plurality of remote side optical outputs each configured to transmit at least one optical downlink signal to a respective remote unit of the plurality of remote units. The multiplex switch unit further comprises a switch connected between the plurality of head-end side inputs and the plurality of remote side optical outputs. The switch is configured to assign each component downlink signal received from the plurality of head-end side inputs to at least one remote unit, including assigning at least one downlink RF communication signal and at least one downlink DD signal to a common remote unit. The switch is further configured to, for each remote unit, multiplex the respective assigned component downlink signals into a combined downlink optical signal, and transmit the respective combined downlink optical signal to the respective assigned at least one remote unit.

The foregoing general description and the following detailed description present embodiments intended to provide an overview or framework for understanding the disclosure. The accompanying drawings are included to provide a further understanding, and are incorporated into and constitute a part of this specification. The drawings illustrate various embodiments, and together with the description serve to explain the principles of the concepts disclosed.

BRIEF DESCRIPTION OF THE FIGURES

FIG. 5A is a table representing a configuration for a matrix management unit;

FIG. 5B is a table representing an alternate configuration for a matrix management unit similar to the configuration table of FIG. 5A;

DETAILED DESCRIPTION

Figure 1:
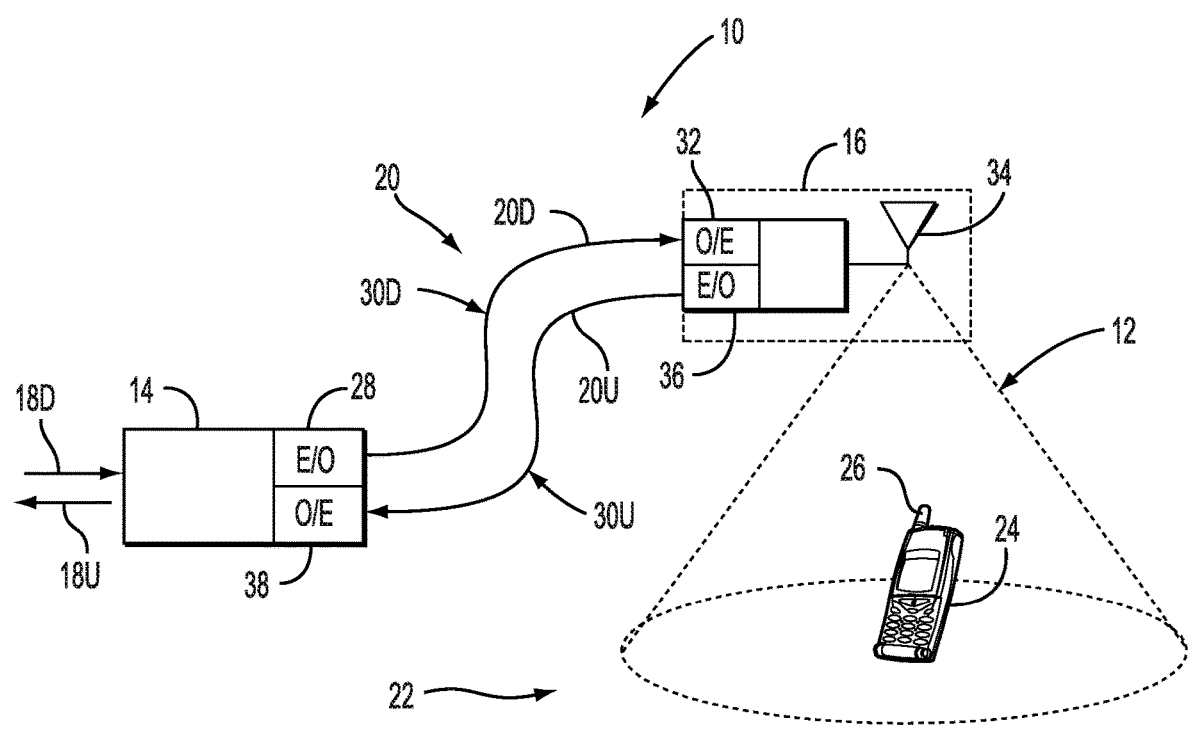
FIG. 1 is a schematic diagram of an exemplary optical fiber-based distributed antenna system (DAS)

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments related to providing simultaneous digital and analog services in optical fiber-based distributed antenna systems (DASs), and related components and methods are also disclosed. A multiplex switch unit associated with a head-end unit of a DAS can be configured to receive a plurality of analog and digital signals from one or more sources, such as a service matrix unit. The multiplex switch unit can be further configured to assign each signal to be transmitted to one or more remote units of the DAS. In one non-limiting example, when two or more signals are assigned to be transmitted to the same remote unit, a wave division multiplexer/demultiplexer associated with the multiplex switch unit can be configured to wave division multiplex component downlink signals into a combined downlink signal for remote side transmission and to demultiplex received combined uplink signals into their component uplink signals for head-end side transmission. Likewise, each remote unit may also include a wave division multiplexer/demultiplexer to separate a received combined downlink signal into individual component downlink signals, and to send received component uplink signals back to the head-end unit as one or more combined uplink signals. In this manner, existing optical fiber networks can be utilized for carrying both analog and digital communications on common optical fibers, and the amount and types of services provided at each remote unit can be individually configured, expanded, or modified to meet demand over time.

Embodiments disclosed in the detailed description include, but are not limited to, optical fiber-based DASs that provide and support radio frequency (RF) communication services and digital data services. The RF communication services and digital data services can be distributed over optical fibers to client devices, such as remote units (RUs) for example. For example, non-limiting examples of digital data services include Ethernet, Wireless Local Area Network (WLAN), Worldwide Interoperability for Microwave Access (WiMax), Wireless Fidelity (WiFi), Digital Subscriber Line (DSL), and Long Term Evolution (LTE), etc. Digital data services can be distributed over common optical fibers with RF communication services. For example, digital data services can be distributed over common optical fibers with RF communication services at different wavelengths through wavelength-division multiplexing (WDM) and/or at different frequencies through frequency-division multiplexing (FDM). Power distributed in the optical fiber-based DAS to provide power to RUs can also be accessed to provide power to digital data service components.

FIG. 1 is a schematic diagram of an embodiment of an optical fiber-based DAS. In this embodiment, the DAS is an optical fiber-based DAS 10 that is configured to create one or more antenna coverage areas 12 for establishing communications with wireless client devices located in a RF range of the antenna coverage areas 12. The optical fiber-based DAS 10 also provides RF communications service (e.g., cellular services). In this embodiment, the optical fiber-based DAS 10 includes a head-end unit (HEU) 14 and one or more remote units (RUs) 16. The HEU 14 is configured to receive communications over downlink electrical signals 18D from a source or sources, such as a network or carrier as examples, and provide such communications to the RU 16 via optical fiber 20 that optically couples the HEU 14 to the RU 16. The HEU 14 is also configured to return communications received from the RU 16, via uplink electrical signals 18U, back to the source or sources. In this regard in this embodiment, the optical fiber 20 includes at least one downlink optical fiber 20D to carry signals communicated from the HEU 14 to the RU 16, and at least one uplink optical fiber 20U to carry signals communicated from the RU 16 back to the HEU 14.

The DAS 10 has an antenna coverage area 12 that can be substantially centered about the RU 16. The antenna coverage area 12 of the RU 16 forms an RF coverage area 22. The HEU 14 is adapted to perform or to facilitate any one of a number of Radio-over-Fiber (RoF) applications, such as RF identification (RFID), wireless local-area network (WLAN) communication, or cellular phone service. Shown within the antenna coverage area 12 is a client device 24 in the exemplary form of a mobile device, which may be a cellular telephone as an example. The client device 24 can be any device that is capable of receiving RF communication signals. The client device 24 includes an antenna 26 (e.g., a wireless card) adapted to receive and/or send electromagnetic RF signals.

With continuing reference to FIG. 1, to communicate the electrical RF signals over the downlink optical fiber 20D to the RU 16, to in turn be communicated to the client device 24 in the antenna coverage area 12 formed by the RU 16, the HEU 14 includes an electrical-to-optical (E/O) converter 28. The E/O converter 28 converts the downlink electrical signals 18D to downlink optical signals 30D to be communicated over the downlink optical fiber 20D. The RU 16 includes an optical-to-electrical (O/E) converter 32 to convert received downlink optical signals 30D back to electrical RF signals to be communicated wirelessly through an antenna 34 of the RU 16 to the client device 24 located in the antenna coverage area 12.

Similarly, the antenna 34 is also configured to receive wireless RF communications from client devices 24 in the antenna coverage area 12. In this regard, the antenna 34 receives wireless RF communications from the client devices 24 and communicates electrical RF signals representing the wireless RF communications to an E/O converter 36 in the RU 16. The E/O converter 36 converts the electrical RF signals into uplink optical signals 30U to be communicated over the uplink optical fiber 20U. An O/E converter 38 provided in the HEU 14 converts the uplink optical signals 30U into uplink electrical RF signals, which can then be communicated as uplink electrical signals 18U back to a network or other source. The HEU 14 in this embodiment is not able to distinguish the location of the client devices 24. The client devices 24 could be in a range of any antenna coverage area 12 formed by an RU 16.

Figure 2:
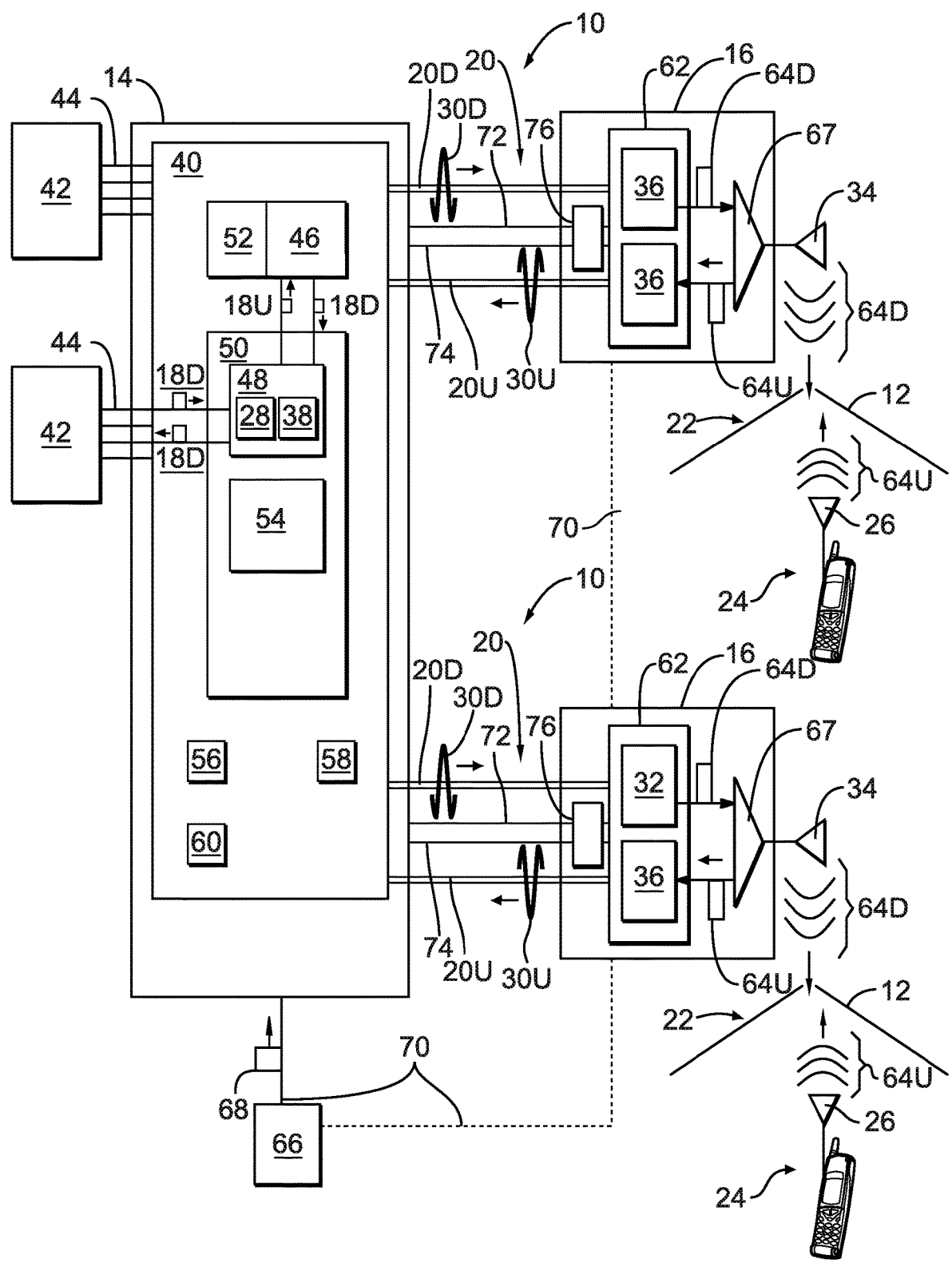
FIG. 2 is a more detailed schematic diagram of an exemplary head-end unit (HEU) and a remote unit (RU) that can be deployed in the DAS of FIG. 1.

In the optical fiber-based DAS 10 of FIG. 1 and other DASs, there is a need to simultaneously provide both analog and digital services to different RUs 16. FIG. 2 is a more detailed schematic diagram of the DAS 10 of FIG. 1 that provides both RF service and digital data signals. In an exemplary embodiment, the HEU 14 includes a service unit 40 that provides electrical RF service signals by passing (or by conditioning and then passing) such signals from one or more external devices 42 via a link 44, such as a local device link or network link. In a particular embodiment, these services may include providing WLAN signal distribution as specified in the Institute of Electrical and Electronics Engineers (IEEE) 802.11 standard, i.e., in a frequency range from 2.4 to 2.5 GigaHertz (GHz) and from 5.0 to 6.0 GHz. Any other electrical RF signal frequencies or digital data service formats are also possible.

In another exemplary embodiment, the service unit 40 provides electrical RF service signals or digital data signals by generating the signals directly. In another exemplary embodiment, the service unit 40 coordinates the delivery of the electrical service signals between the client devices 24 within the antenna coverage area 12. These analog and/or digital services may be provided at a head-end side of the HEU 14, for example one or more service matrix cards (not shown) that interface with a matrix management unit (MMU) 46. The MMU 46 may also be configured to interface with one or more external devices 42, such as a conventional base transceiver station (BTS) or a small cell unit (described in detail with respect to FIG. 4). With continuing reference to FIG. 2, the MMU 46 may be coupled to one or more converter pairs 48, each comprising an E/O converter 28 and an O/E converter 38, within a multiplex switch unit 50. The multiplex switch unit 50 is configured to selectively receive and transmit a plurality of analog and digital signals to and from each of a plurality of RUs 16 via the service unit 40. The multiplex switch unit 50 may have a plurality of head-end side input/output port pairs (not shown) for interfacing with individual service matrix units 52 (described below with respect to FIG. 3A), or the external devices 42. The multiplex switch unit 50 may be configured to selectively provide different analog and digital services simultaneously to a plurality of different RUs 16.

With continuing reference to FIG. 2, the service unit 40 includes a plurality of E/O converters 28 that receive the downlink electrical signals 18D from the service unit 40 and convert them to corresponding downlink optical signals 30D. One advantage of using optical signals is that optical fiber has a comparatively large amount of bandwidth and is capable of carrying optical signals containing a large amount of information over long distances. In an exemplary embodiment, the E/O converters 28 include a laser (not shown) suitable for delivering sufficient dynamic range for the RoF applications described herein, and optionally include a laser driver/amplifier electrically coupled to the laser. Examples of suitable lasers for the E/O converters 28 include, but are not limited to, laser diodes, distributed feedback (DFB) lasers, Fabry-Perot (FP) lasers, and vertical cavity surface emitting lasers (VCSELs).

The HEU 14 also includes a plurality of O/E converters 38, which are electrically coupled to the service unit 40 via the multiplex switch unit 50, for example. The O/E converters 38 receive the uplink optical signals 30U and convert them to corresponding uplink electrical signals 18U, so that they may be routed to the various external devices 42 by the local electronic circuitry of the HEU 14. In an exemplary embodiment, the O/E converter 38 is a photodetector, or a photodetector electrically coupled to a linear amplifier. The E/O converter 28 and the O/E converter 38 constitute a "converter pair" 48, as illustrated in FIG. 2.

In accordance with an exemplary embodiment, the multiplex switch unit 50 in the service unit 40 of the HEU 14 can include a modulator/demodulator unit 54, such as a wave division multiplexer/demultiplexer, for multiplexing the downlink RF and DD component signals, and demultiplexing the uplink combined RF and DD component electrical signals, respectively. The service unit 40 can include a digital signal processing unit ("digital signal processor") 56 for providing to the modulator/demodulator unit 54 an electrical signal that is modulated onto an RF carrier (not shown) to generate a desired downlink electrical signal 18D. The digital signal processor 56 is also configured to process a demodulation signal provided by the demodulation of the uplink electrical signal 18U by the modulator/demodulator unit 54. The HEU 14 can also include an optional central processing unit (CPU) 58 for processing data and otherwise performing logic and computing operations, and a memory unit 60 for storing data, such as data to be transmitted over a WLAN or other network for example.

In this manner, when more than one downlink signal is assigned by the multiplex switch unit 50 to be transmitted to the same RU 16, the modulator/demodulator unit 54 can be configured to combine the component downlink signals into a combined downlink signal for remote side transmission, and to divide received combined uplink signals into their component uplink signals for head-end side transmission to the respective service interface, such as an external device 42. For example, the modulator/demodulator unit 54 may include a wave division multiplexer/demultiplexer. In this manner, existing optical fiber networks can be utilized for providing both analog and digital communications over the same optical fibers 20, and the amount and types of services provided at each RU 16 can be individually configured, expanded or modified to meet demand over time. In this manner as well, each RU 16 requires a single fiber optic cable pair to run between the RU 16 and the HEU 14 to receive a plurality of both analog and digital component signals.

With continuing reference to FIG. 2, the RU 16 also includes a converter pair 62 comprising the O/E converter 32 and the E/O converter 36. The O/E converter 32 converts the received downlink optical signals 30D from the HEU 14 back into downlink electrical signals 64D. The E/O converter 36 converts uplink electrical signals 64U received from the client device 24 into the uplink optical signals 30U to be communicated to the HEU 14. The O/E converter 32 and the E/O converter 36 are electrically coupled to the antenna 34 via a signal-directing element 67, such as a circulator. The signal-directing element 67 serves to direct the downlink electrical signals 64D and the uplink electrical signals 64U, as discussed below. In accordance with an exemplary embodiment, the antenna 34 can include one or more patch antennas, such as disclosed in U.S. patent application Ser. No. 11/504,999, filed Aug. 16, 2006 entitled "Radio-over-Fiber Transponder With A Dual-Band Patch Antenna System," and U.S. patent application Ser. No. 11/451,553, filed Jun. 12, 2006 entitled "Centralized Optical Fiber-Based Wireless Picocellular Systems and Methods," both of which are incorporated herein by reference in their entireties.

The DAS 10 also includes a power supply 66 that generates an electrical power signal 68. The power supply 66 is electrically coupled to the HEU 14 for powering the power-consuming elements therein. In an exemplary embodiment, an electrical power line 70 runs through the HEU 14 and over to the RU 16 to power the O/E converter 32 and the E/O converter 36 in the converter pair 62, the signal-directing element 67 (unless the signal-directing element 67 is a passive device, such as a circulator for example), and any other power-consuming elements provided. The electrical power line 70 includes two wires 72 and 74 that carry a single voltage and that are electrically coupled to a DC power converter 76 at the RU 16. The DC power converter 76 is electrically coupled to the O/E converter 32 and the E/O converter 36 in the converter pair 62, and changes the voltage or levels of the electrical power signal 68 to the power level(s) required by the power-consuming components in the RU 16. The DC power converter 76 can be either a DC/DC power converter or an AC/DC power converter, depending on the type of the electrical power signal 68 carried by the electrical power line 70. In another embodiment, the electrical power line 70 runs directly from the power supply 66 to the RU 16, rather than from or through the HEU 14. In another exemplary embodiment, the electrical power line 70 includes more than two wires 72, 74 and carries multiple voltages.

Figure 3A:
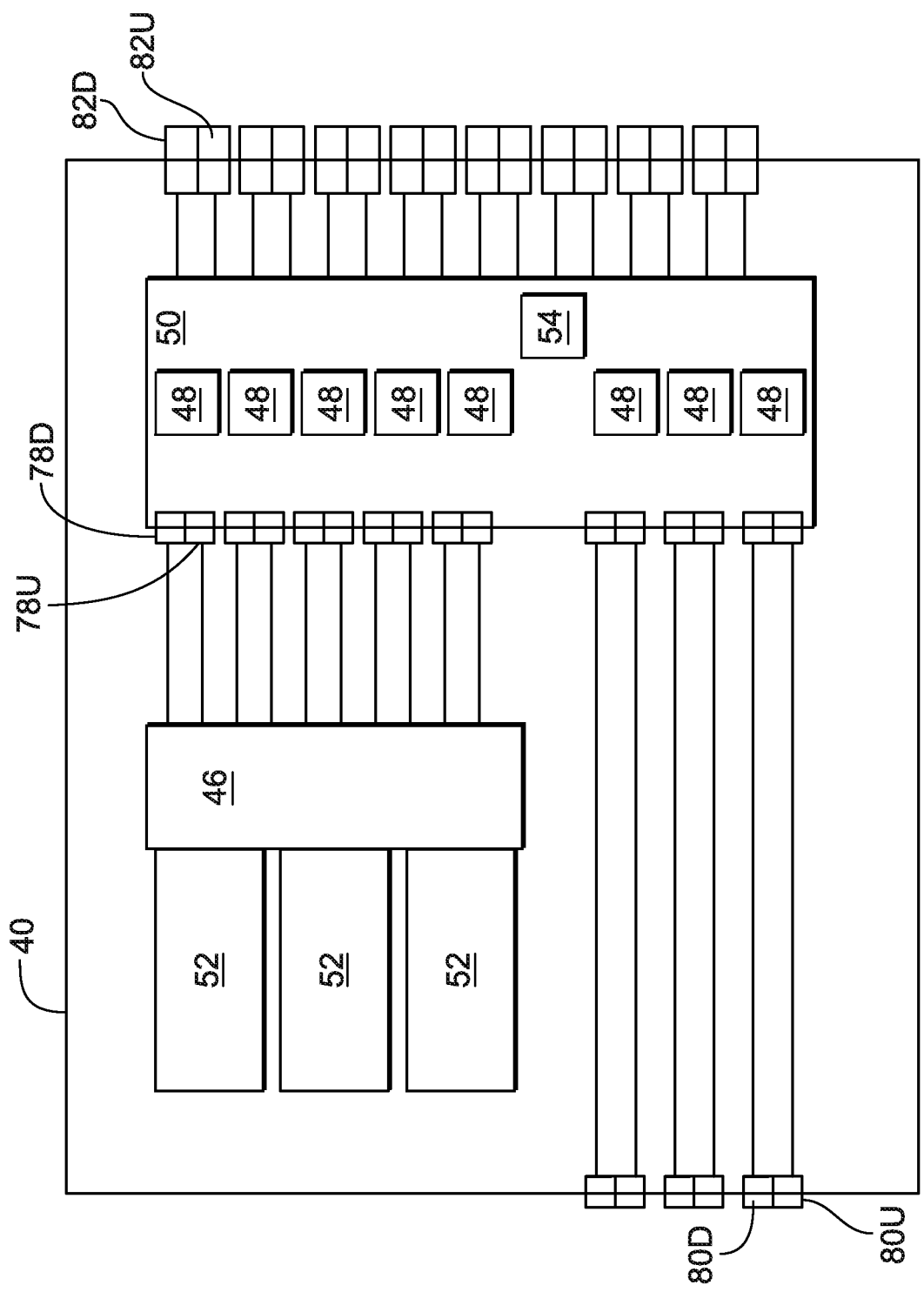
FIG. 3A is detailed schematic diagram of an exemplary service unit for a HEU that can be deployed in the DAS of FIG. 1 for providing digital data services and radio frequency (RF) communication services.

FIG. 3A is a schematic diagram of exemplary internal components in the service unit 40 of FIG. 2 illustrating a more detailed layout of the components and connections therebetween. This detailed view provides a more focused description of the signal assignment and distribution functionality of the service unit 40. The service unit 40, which is configured to be installed in the HEU 14, includes the MMU 46, the service matrix units 52, the multiplex switch unit 50, and the modulator/demodulator unit 54. In this embodiment, a remote side of the MMU 46 is connected to the plurality of head-end sides of the multiplex switch unit 50 via a plurality of remote side input/output (I/O) connections 78D, 78U. The multiplex switch unit 50 may also have additional I/O connections 78D, 78U connected to head-end side input/output port pairs 80D, 80U for interfacing with one or more external devices 42 (not shown) as well.

Component downlink signals are received by the multiplex switch unit 50 via the remote side output connections 78D of the MMU 46. In this embodiment, the component downlink signals include at least one downlink RF communication signal and at least one downlink DD signal. Each component downlink signal is then assigned to at least one of a plurality of remote side optical outputs 82D of the multiplex switch unit 50. At least one downlink RF communication signal and at least one downlink DD signal are assigned to a single common remote side optical output 82D. For each remote side optical output 82D having only one assigned component downlink signal, the respective component downlink signal is passed through and transmitted as a component downlink optical signal to the assigned remote side optical output(s) 82D. For each remote side optical output 82D having more than one assigned component downlink signal, the respective assigned component downlink signals are multiplexed into a combined downlink optical signal. The combined downlink optical signal is then transmitted to the assigned remote side optical output(s) 82D.

Each remote side optical output 82D has a complementary remote side optical input 82U, each configured to receive uplink optical signals 30U from a respective connected RU 16 (not shown). If the received uplink optical signal 30U is a combined uplink optical signal, the signal is demultiplexed into its component uplink optical signals by the modulator/demodulator unit 54 of the multiplex switch unit 50. The multiplex switch unit 50 then routes each received component uplink signal toward its respective service matrix unit 52, external device 42, or other service interface.

Figure 3B:
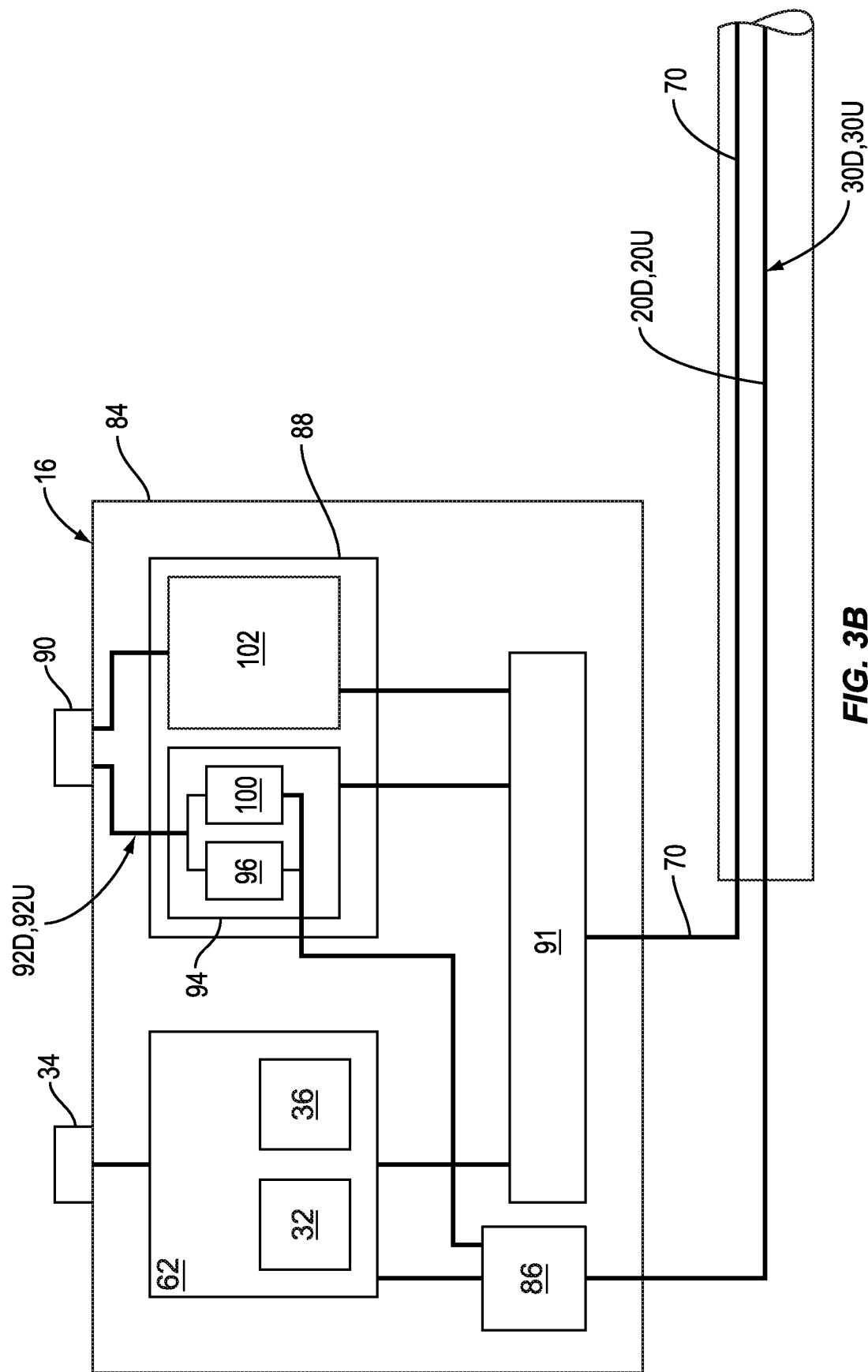
FIG. 3B is a schematic diagram of an exemplary RU that can be deployed in the DAS of FIG. 1 for providing digital data services and RF communication services.

FIG. 3B is a schematic diagram of internal components in the RU 16 of FIG. 3A to further illustrate how the downlink and uplink optical fibers 20D, 20U, and electrical power line 70 are provided to the RU 16 and can be distributed therein. The downlink and uplink optical fibers 20D, 20U, which provide optical signal transmission of the multiplexed combined downlink optical signals 30D received from the HEU 14 and complementary combined uplink optical signals 30U transmitted back to the HEU 14, come into a housing 84 of the RU 16, along with the electrical power line 70. The downlink and uplink optical fibers 20D, 20U are first routed to the modulator/demodulator unit 86, which divides combined downlink signals into their component signals. RF communications are routed to the O/E converter 32 and to the antenna 34, as also illustrated in FIG. 2 and as previously discussed. Meanwhile, digital data services are routed from the modulator/demodulator unit 86 to a digital data services interface 88 provided as part of the RU 16 to provide access to digital data services via a port 90, which will be described in more detail below. The electrical power line 70 carries power that is configured to provide power to the converter pair 62 and to the digital data services interface 88. The electrical power line 70 is coupled to a voltage controller 91 that regulates and provides the correct voltage to the converter pair 62 and to the digital data services interface 88 and other circuitry in the RU 16.

The digital data services interface 88 converts downlink optical signals 30D into downlink electrical digital signals 92D that can be accessed via the port 90. The interface 88 also converts uplink electrical digital signals 92U received through the port 90 into uplink optical signals 30U to be provided back to the HEU 14. In this regard, a media converter 94 is provided in the digital data services interface 88 to effect these conversions. The media converter 94 contains an O/E digital converter 96 to convert downlink optical digital signals 98D into downlink electrical digital signals 92D. The media converter 94 also contains an E/O digital converter 100 to convert uplink electrical digital signals 92U received through the port 90 into uplink optical digital signals 98U to be provided back to the modulator/demodulator unit 86. Power from the electrical power line 70 is provided to the digital data services interface 88 to provide power to the media converter 94.

In this embodiment, when a RU 16 receives a combined downlink signal, the modulator/demodulator unit 86 divides the combined downlink signal into its component downlink signals and, based on the interface type for each component downlink signal, routes each signal to either O/E digital converter 96 and E/O digital converter 100 or to the digital data services interface 88. Likewise, for each RU 16 that receives more than one component uplink signal at a RU 16, the component uplink signals are multiplexed by the modulator/demodulator unit 86 into a combined optical uplink signal and transmitted over the uplink optical fiber 20U to the HEU 14.

Because electrical power is provided to the RU 16 and the digital data services interface 88, this also provides an opportunity to provide power for digital devices connected to the RU 16 via the port 90. In this regard, a power interface 102 is also provided in the digital data services interface 88, as illustrated in FIG. 3B. The power interface 102 is configured to receive power from the electrical power line 70 via the voltage controller 91, and to also make power accessible through the port 90. In this manner, if a client device 24 (not shown) contains a compatible connector to connect to the port 90, not only will digital data services be accessible, but power from the electrical power line 70 can also be accessed through the same port 90. Alternatively, the power interface 102 could be coupled to a separate port from the port 90 for digital data services.

Further, the HEU 14 could include low level control and management of the media converter 94 using communication supported by the HEU 14. For example, the media converter 94 could report functionality data (e.g., power on, reception of optical digital data, etc.) to the HEU 14 over the uplink optical fiber 20U that carries communication services. The RU 16 can include a microprocessor that communicates with the media converter 94 to receive this data and communicate this data over the uplink optical fiber 20U to the HEU 14.

Figure 4:
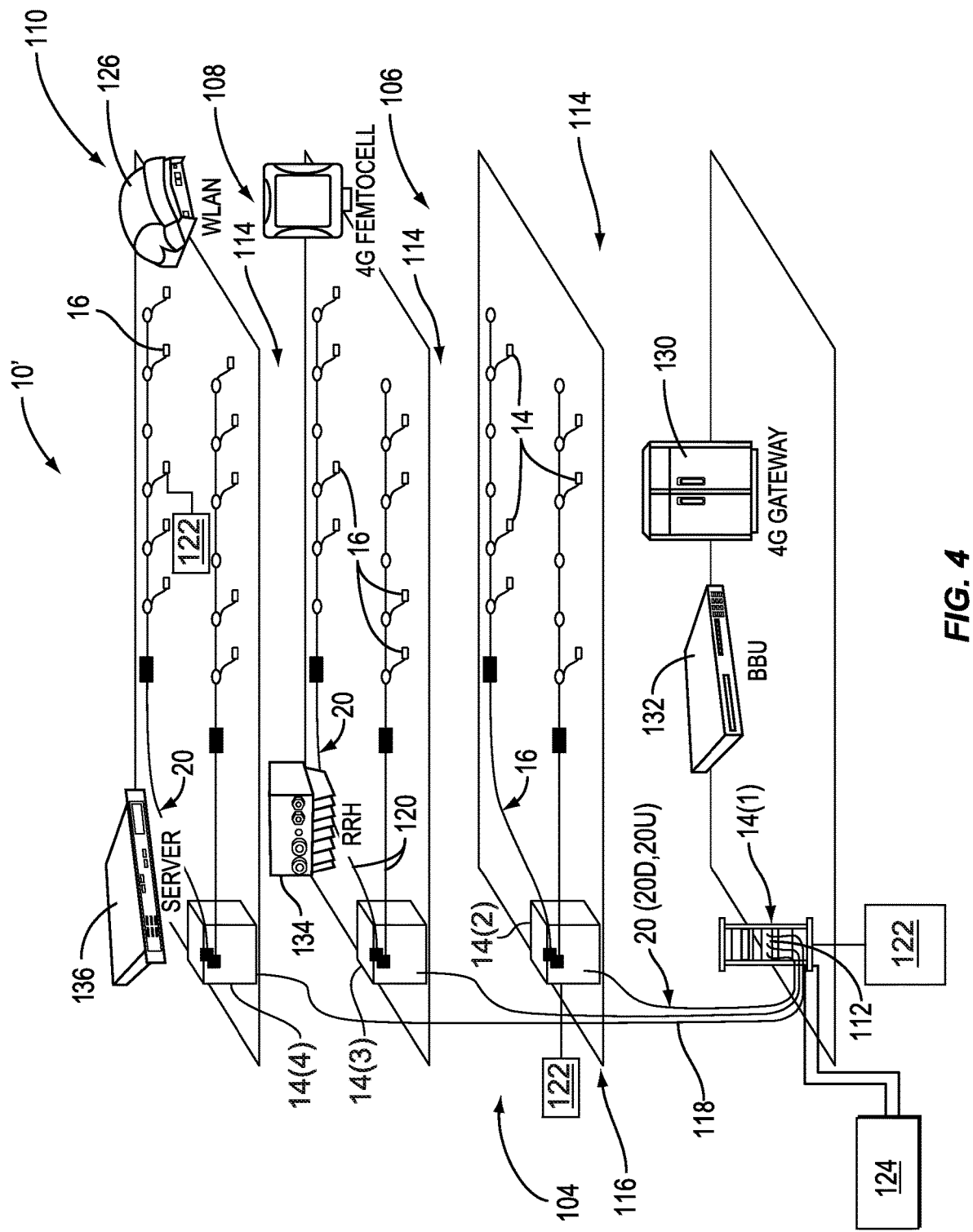
FIG. 4 is a partially schematic cut-away diagram of an exemplary building infrastructure in which the DAS in FIG. 1 can be employed.

In this manner, different analog and digital services can be selectively provided to different RUs 16 and client devices 24 throughout different areas covered by the DAS 10. FIG. 4 provides further illustration of how an optical fiber-based DAS such as shown in FIGS. 1-3B can be deployed indoors. FIG. 4 is a partially schematic cut-away diagram of a building infrastructure 104 employing an optical fiber-based DAS 10' similar to the optical fiber-based DAS 10 of FIGS. 1-3B. The building infrastructure 104 generally represents any type of building in which the optical fiber-based based DAS 10' can be deployed. As previously discussed with regard to FIGS. 1 and 2, the optical fiber-based DAS 10' incorporates the HEU 14(1) to provide various types of communication services to antenna coverage areas within the building infrastructure 104, as an example. For example, as discussed in more detail below, the optical fiber-based DAS 10' in this embodiment is configured to receive wireless RF signals and convert the RF signals into RoF signals to be communicated over the optical fiber 20 to multiple RUs 16. The optical fiber-based DAS 10' in this embodiment can be, for example, an indoor DAS (IDAS) to provide wireless service inside the building infrastructure 104. These wireless signals can include cellular service, wireless services such as RFID tracking, WiFi, local area network (LAN), WLAN, and combinations thereof.

With continuing reference to FIG. 4, the building infrastructure 104 includes a first (ground) floor 106, a second floor 108, and a third floor 110. The floors 106, 108, 110 are serviced by the HEU 14(1) through a main distribution frame 112 to provide antenna coverage areas 114 in the building infrastructure 104. Only the ceilings of the floors 106, 108, 110 are shown in FIG. 4 for simplicity of illustration. In this embodiment, a main cable 116 has a number of different sections that facilitate the placement of a large number of RUs 16 in the building infrastructure 104. Each RU 16 in turn services its own coverage area in the antenna coverage areas 114. The main cable 116 can include, for example, a riser cable 118 that carries all of the downlink and uplink optical fibers 20D, 20U to and from the HEU 14(1). The riser cable 118 may be routed through an interconnect unit (ICU) (not shown). The main cable 116 can include one or more multi-cable (MC) connectors (not shown) adapted to connect select downlink and uplink optical fibers 20D, 20U, along with an electrical power line 70 (not shown), to a number of optical fiber cables 120. Additional slave HEUs 14(2)-14(4) can be included in the DAS 10' and connected back to master HEU 14(1). Each slave HEU 14(2)-14(4) is responsible for managing a subset of RUs 16 in the DAS 10'.

Each HEU 14 is able to receive additional services as well. In this embodiment, slave HEU 14(2) is connected to a small cell unit 122, which provides a separate suite of analog and/or digital services to the DAS 10' independently of the BTS 124. In addition, small cell units 122 may be connected to individual RUs 16 to provide services to those specific RUs 16. In this manner, as small cell deployment increases or decreases for different services and RUs 16, the multiplex switch unit 50 of each HEU 14 can activate or deactivate BTS 124 based services as needed. For example, if a small cell renders a BTS 124 based service redundant for a portion of the DAS 10', the multiplex switch unit 50 can be configured to only send the BTS 124 based service to RUs 16 of the DAS 10' not already serviced by the small cell unit 122.

The main cable 116 enables multiple optical fiber cables 120 to be distributed throughout the building infrastructure 104 (e.g., fixed to the ceilings or other support surfaces of each floor 106, 108, 110) to provide the antenna coverage areas 114 for the first, second, and third floors 106, 108, 110. In one embodiment, the HEU 14 is located within the building infrastructure 104 (e.g., in a closet or control room), while in another embodiment, the HEU 14 is located outside of the building infrastructure 104 at a remote location. The BTS 124, which may be provided by a second party such as a cellular service provider, is connected to the HEU 14, and can be co-located or located remotely from the HEU 14. A BTS 124 is any station or source that provides an input signal to the HEU 14 and can receive a return signal from the HEU 14. In a typical cellular system, for example, a plurality of BTSs 124 are deployed at a plurality of remote locations to provide wireless telephone coverage. Each BTS 124 serves a corresponding cell and when a mobile station enters the cell, the BTS 124 communicates with the mobile station. Each BTS 124 can include at least one radio transceiver for enabling communication with one or more subscriber units operating within the associated cell.

The optical fiber-based DASs 10, 10' in FIGS. 1-4 provides point-to-point communications between the HEU 14 and the RU 16. Each RU 16 communicates with the HEU 14 over a distinct downlink and uplink optical fiber pair to provide point-to-point communications. Whenever a RU 16 is installed in the optical fiber-based DAS 10, the RU 16 is connected to a distinct downlink and uplink optical fiber pair connected to the HEU 14. The downlink and uplink optical fibers 20D, 20U may be provided in the optical fiber 20. Multiple downlink and uplink optical fiber pairs can be provided in a fiber optic cable to service multiple RUs 16 from a common fiber optic cable. For example, with reference back to FIG. 4, RUs 16 installed on a given floor 106, 108, 110 may be serviced from the same optical fiber 20. The optical fiber 20 may thus have multiple nodes where distinct downlink and uplink optical fiber pairs can be connected to a given RU 16.

As discussed above in reference to FIG. 4, the building infrastructure 104 is able to provide digital data services simultaneous with RF communications services to client devices 24 located therein. Wired and wireless devices may be located in the building infrastructure 104 that are configured to access digital data services. Examples of digital data services include, but are not limited to, Ethernet, WLAN, WiMax, WiFi, DSL, and LTE, etc. Ethernet standards could be supported, including but not limited to 100 Megabits per second (Mbs) (i.e., fast Ethernet) or Gigabit (Gb) Ethernet, or ten Gigabit (10 G) Ethernet. Examples of digital data devices include, but are not limited to, WLAN access points 126, femtocells 128, gateways 130, baseband units (BBU) 132, remote radio heads (RRH) 134, and wired and wireless servers 136. Digital data services may also be provided via connected desktop computers, hubs, switches, and other devices.

Embodiments disclosed herein provide optical fiber-based DASs that support both RF communications services and digital data services. The RF communications services and digital data services can be distributed over optical fibers to client devices such as RUs. Alternatively, digital data services can be distributed over common optical fibers with RF communications services in an optical fiber-based DAS. For example, digital data services can be distributed over common optical fibers with RF communications services at different wavelengths through wavelength-division multiplexing (WDM) and/or at different frequencies through frequency-division multiplexing (FDM).

In order to selectively provide these different analog and digital services simultaneously from a number of different modular service matrix units 52 to different RUs 16 in the DAS 10, the MMU 46 can be configured in a variety of ways. Referring now to FIG. 5A, a table 138 representing an exemplary configuration for the MMU 46 is illustrated. In this embodiment, each service matrix unit 52 is configured to support a plurality of services. Each service has a plurality of attributes, including frequency band (column 140), technology (column 142), provider (column 144), and interface (column 146), as are known in the art.

In this embodiment, service matrix unit 52(1) is configured to support three services provided by Provider 1. Likewise, service matrix unit 52(2) is configured to support four services provided by Provider 2, and service matrix unit 52(3) is configured to support two services provided by Provider 3. Finally, service matrix unit 52(4) is configured to support one service provided by Provider 4, along with a government maintained LTE service and a local WiFi service. Both service matrix unit 52(2) and 52(4) are configured to provide both digital and analog services from the same service matrix unit 52.

FIG. 5B illustrates a configuration table 138' for MMU 46 according to an alternative embodiment. In FIG. 5B, the service matrix units 52 each provide a plurality of services sharing a common technology. For example, service matrix unit 52(5) includes the three analog and digital LTE services, service matrix unit 52(6) includes the four CDMA services, service matrix unit 52(7) includes the three analog and digital WCDMA services, and service matrix unit 52(8) includes the local WiFi service.

Figure 6:
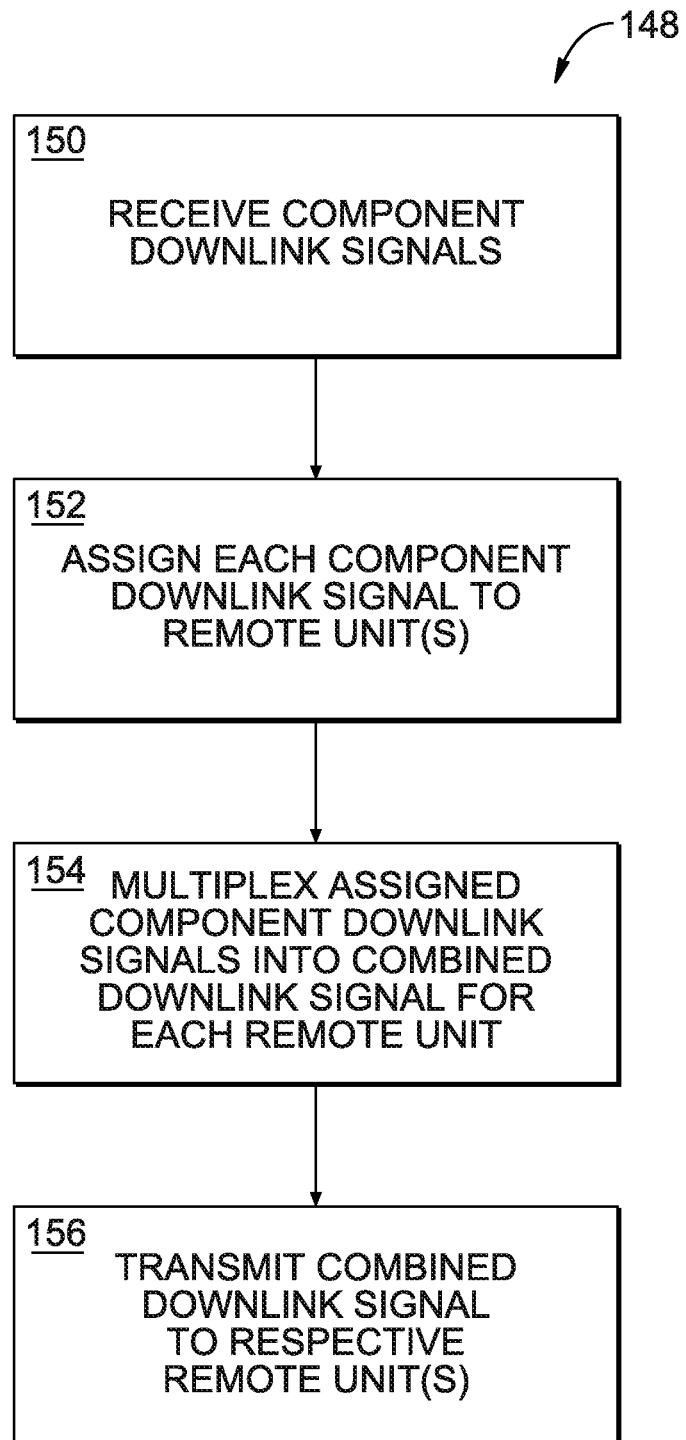
FIG. 6 illustrates an exemplary workflow for providing simultaneous analog and digital services over an optical fiber-based DAS according to one embodiment.

FIG. 6 a process by which the multiplex switch unit 50 can selectively provide simultaneous analog and digital services over an optical fiber-based DAS. In workflow 148, a multiplex switch unit, such as the multiplex switch unit 50 of FIGS. 2-4, of a DAS receives a plurality of component downlink signals at a plurality of head-end side inputs (block 150). The plurality of component downlink signals includes at least one downlink RF communication signal and at least one downlink DD signal. Next, each component downlink signal is assigned to at least one of a plurality of remote side optical outputs, such as remote side optical outputs 82D of multiplex switch unit 50 of FIG. 3A (block 152). This assignment function includes assigning at least one downlink RF communication signal and at least one downlink DD signal to a common remote side optical output.

For each remote side optical output, the respective assigned component downlink signals are multiplexed, for example, by modulator/demodulator unit 86 of FIGS. 2-4, into a combined downlink optical signal (block 154). Each combined downlink optical signal is then transmitted to the respective assigned remote side optical output(s) (block 156). This process thus facilitates simultaneous distribution of analog and digital services over an optical fiber-based DAS.

Figure 7:
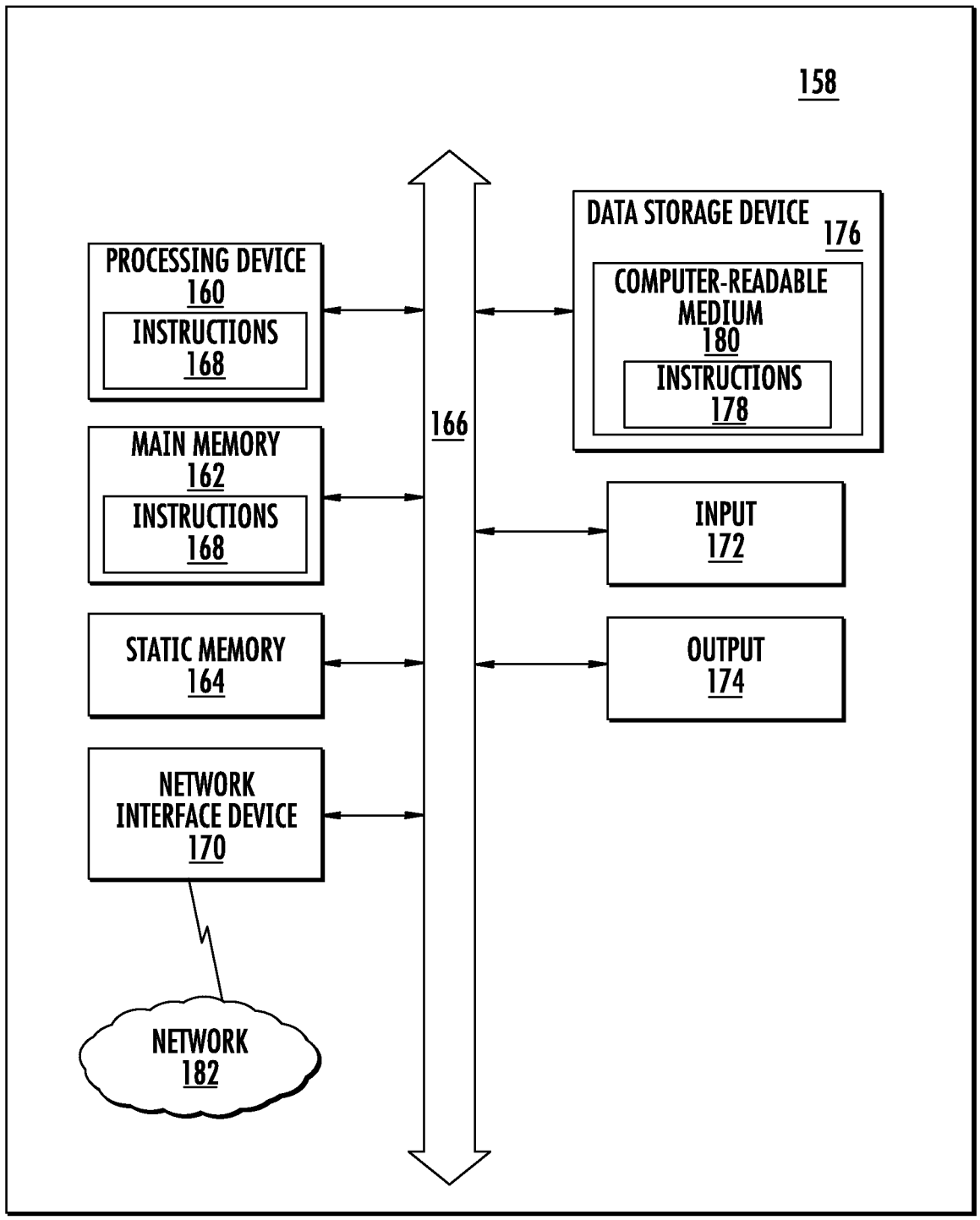
FIG. 7 is a schematic diagram of a generalized representation of a controller that can be included in any head-end units, remote units, wireless client devices, and/or any other components of a DAS to simultaneously provide analog and digital services as disclosed herein.

The above described devices, systems and methods may also be controlled and performed via a processor based computing device or controller. FIG. 7 is a schematic diagram representation illustrating components with additional detail that could be employed in any of the components or devices disclosed herein or in the distributed antenna systems described herein, if adapted to execute instructions from an exemplary computer-readable medium to perform any of the functions or processing described herein. For example, these components may be integrated into or be configured to otherwise instruct the service unit 40 of FIGS. 2-4 to carry out one or more of the power management schemes described above. For example, the processes described in FIG. 6 above could be provided as a result of executing instructions from a computer-readable medium. Such a component or device may include a computer system 158, within which a set of instructions for performing any one or more of the distribution schemes discussed herein may be executed. The computer system 158 may be connected (e.g., networked) to other machines in a LAN, an intranet, an extranet, or the Internet. While only a single device is illustrated, the term "device" shall also be taken to include any collection of devices that individually or jointly execute a set (or multiple sets) of instructions to perform any one or more of the methodologies discussed herein. The computer system 158 may be a circuit or circuits included in an electronic board card, such as, a printed circuit board (PCB), a server, a personal computer, a desktop computer, a laptop computer, a personal digital assistant (PDA), a computing pad, a mobile device, or any other device, and may represent, for example, a server or a user's computer.

The exemplary computer system 158 includes a processing device or processor 160, a main memory 162 (e.g., read-only memory (ROM), flash memory, dynamic random access memory (DRAM), such as synchronous DRAM (SDRAM), etc.), and a static memory 164 (e.g., flash memory, static random access memory (SRAM), etc.), which may communicate with each other via a data bus 166. Alternatively, the processing device 160 may be connected to the main memory 162 and/or static memory 164 directly or via some other connectivity means. The processing device 160 may be a controller, and the main memory 162 or static memory 164 may be any type of memory.

The processing device 160 represents one or more general-purpose processing devices, such as a microprocessor, central processing unit, or the like. More particularly, the processing device 160 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processing device 160 is configured to execute processing logic in instructions 168 for performing the operations and steps discussed herein.

The computer system 158 may further include a network interface device 170. The computer system 158 also may include an input 172, configured to receive input and selections to be communicated to the computer system 158 when executing the instructions 168. The computer system 158 also may include an output 174, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 158 may include a data storage device 176 that includes instructions 178 stored in a computer-readable medium 180. The instructions 178 may also reside, completely or partially, within the main memory 162 and/or within the processing device 160 during execution thereof by the computer system 158, wherein the main memory 162 and the processing device 160 also constitute the computer-readable medium 180. The instructions 178 may further be transmitted or received over a network 182 via the network interface device 170.

While the computer-readable medium 180 is shown in an exemplary embodiment to be a single medium, the term "computer-readable medium" includes a single medium or multiple media (e.g., a centralized or distributed database, and/or associated caches and servers) that store the instructions 168. The term "computer-readable medium" shall also include any medium that is capable of storing, encoding, or carrying a set of instructions for execution by the processing device and that cause the processing device to perform any one or more of the methodologies of this disclosure. The term "computer-readable medium" shall accordingly include, but not be limited to, solid-state memories, optical and magnetic medium, and carrier wave signals.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform processes. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); a machine-readable transmission medium (electrical, optical, acoustical, or other form of propagated signals (e.g., carrier waves, infrared signals, digital signals, etc.)); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices. The algorithms and displays presented herein are not inherently related to any particular computer or other apparatus or with reference to any particular programming language.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. Or, the storage medium may be integral to the processor. The processor and the storage medium may reside in an ASIC residing in a remote station, or as discrete components in a remote station, base station, or server.

The operational steps described in any of the embodiments herein are described to provide examples and discussion and may be performed in numerous different sequences other than the illustrated sequences. Operations described in a single operational step may actually be performed in a number of different steps, and one or more operational steps may be combined. Information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Further and as used herein, the terms "fiber optic cables" and/or "optical fibers" include all types of single mode and multi-mode light waveguides, including one or more optical fibers that may be upcoated, colored, buffered, ribbonized, and/or have other organizing or protective structure in a cable such as one or more tubes, strength members, jackets, or the like. The optical fibers disclosed herein can be single mode or multi-mode fibers.

Other configurations are possible to provide simultaneous analog and digital services in an optical fiber-based DAS. For example, while some exemplary embodiments above focus on combining uplink and downlink signals using the modulator/demodulator unit 54, FDM may also be used. Combining frequency up conversions or down conversions may be employed when providing FDM if RF communication signals have frequencies too close to the frequencies of the digital data signals to avoid interference. While digital baseband transmission of a baseband digital data signal below the spectrum of the RF communication signals can be considered, intermodulation distortion on the RF communication signals may be generated. Another approach is to up convert the digital data signals above the frequencies of the RF communication signals and also use, for example, a constant envelope modulation format for digital data signal modulation. Frequency Shift Keying (FSK) and Minimum Shift Keying (MSK) modulation are suitable examples for such modulation formats. Further, in the case of FDM for digital data services, higher-level modulation formats can be considered to transmit high data rates (e.g., one (1) Gb, or ten (10) Gb) over the same optical fiber as the RF communication signals. Multiple solutions using single-carrier (with e.g., 8-FSK or 16-QAM as examples) or multi-carrier (OFDM) are conceivable.

Many modifications and other embodiments of the embodiments set forth herein will come to mind to one skilled in the art to which the embodiments pertain, and having the benefit of the teachings presented in the forgoing descriptions and the associated drawings.

Therefore, the description and claims are not to be limited to the specific embodiments disclosed, and that modifications and other embodiments are intended to be included within the scope of the appended claims. It is intended that the embodiments cover the modifications and variations of the embodiments provided they come within the scope of the appended claims and their equivalents. Specific terms are used herein in a descriptive sense only and not for purposes of limitation.

We claim:

1. A non-transitory computer readable medium comprising instructions for directing a processor to perform a method, wherein the instructions, when executed, direct the processor to:
assign each component downlink signal received at a plurality of head-end side inputs to at least one of a plurality of remote side optical outputs of a multiplex switch unit in a wireless communication system, including selectively assigning at least one downlink radio frequency (RF) communication signal and at least one downlink digital data (DD) signal of each component downlink signal to a specific common remote side optical output based on a determination that the at least one downlink RF communication signal and the at least one downlink DD signal are to be transmitted to a common remote unit, wherein the specific common remote side optical output corresponds to the common remote unit, and wherein a plurality of component downlink signals comprising at least one downlink RF communication signal and at least one downlink (DD signal are received at the plurality of head-end side inputs of the multiplex switch unit; and
for each remote side optical output:
instruct the multiplex switch unit to multiplex the respective assigned component downlink signals into a combined optical downlink signal; and
instruct the multiplex switch unit to transmit the respective combined optical downlink signal to the assigned at least one of the plurality of remote side optical outputs.

2. The non-transitory computer readable medium of claim 1, wherein the processor is further directed to instruct the multiplex switch unit to multiplex the plurality of component downlink signals into the combined optical downlink signal by wave division multiplexing the plurality of component downlink signals into the combined optical downlink signal.

3. The non-transitory computer readable medium of claim 1, wherein at least some of the plurality of component downlink signals are received at respective head-end side inputs from at least one service matrix unit, each service matrix unit transmitting at least one downlink RF communication signal and at least one downlink DD signal to at least one respective head-end side input.

4. The non-transitory computer readable medium of claim 1, wherein a plurality of optical uplink signals are received at a plurality of remote side optical inputs, wherein each of the plurality of remote side optical inputs is complementary to a corresponding one of the plurality of remote side optical outputs, each optical uplink signal of the plurality of optical uplink signals comprising at least one component optical uplink signal.

5. The non-transitory computer readable medium of claim 4, wherein:
at least one optical uplink signal is a combined optical uplink signal comprising a plurality of component optical uplink signals; and
at least one combined optical uplink signal comprises at least one uplink RF communication signal and at least one uplink DD signal.

6. The non-transitory computer readable medium of claim 5, wherein the processor is further directed to:
for each remote side optical input receiving a combined optical uplink signal, instruct the multiplex switch unit to separate each combined optical uplink signal into each of a respective component optical uplink signal of the plurality of component optical uplink signals; and
instruct the multiplex switch unit to transmit each component optical uplink signal toward a respective at least one head-end side output.

7. The non-transitory computer readable medium of claim 6, wherein the processor is further directed to instruct the multiplex switch unit to transmit at least some of the plurality of component optical uplink signals from respective head-end side outputs to at least one service matrix unit, each service matrix unit receiving at least one uplink RF communication signal and at least one uplink DD signal from at least one respective head-end side output.

8. The non-transitory computer readable medium of claim 1, wherein the plurality of component downlink signals are electrical signals, the multiplex switch unit comprises at least one electro-optical converter, and wherein the processor is further configured to instruct the multiplex switch unit to convert each component downlink signal into a respective component optical downlink signal.

9. The non-transitory computer readable medium of claim 1, wherein each combined optical downlink signal is a wave division multiplexed optical signal.

10. The non-transitory computer readable medium of claim 9, wherein each combined optical downlink signal is generated by a wave division multiplexer (WDM) associated with the multiplex switch unit.

11. The non-transitory computer readable medium of claim 6, wherein the at least one head-end side output comprises electrical outputs, and the multiplex switch unit further comprises at least one electro-optical converter, and wherein the processor is further configured to instruct the multiplex switch unit to convert each component optical uplink signal into a respective component electrical uplink signal and transmit each respective component electrical uplink signal to the respective at least one head-end side output.

12. The non-transitory computer readable medium of claim 6, wherein each combined optical uplink signal is a wave division multiplexed optical signal.

13. The non-transitory computer readable medium of claim 12, wherein each combined optical uplink signal is divided by a wave division divider (WDD) associated with the multiplex switch unit.

14. A method of operating a multiplex switch unit for a wireless communication system comprising a plurality of remote units having at least one antenna assembly and being optically coupled to the multiplex switch unit, comprising:
receiving, at a plurality of head-end side inputs of the multiplex switch unit, a plurality of component downlink signals comprising at least one downlink radio frequency (RF) communication signal and at least one downlink digital data (DD) signal;
assigning each component downlink signal received at the plurality of head-end side inputs to at least one of a plurality of remote side optical outputs of the multiplex switch unit, including selectively assigning at least one downlink RF communication signal and at least one downlink DD signal to a specific common remote side optical output based on a determination that the at least one downlink RF communication signal and the at least one downlink DD signal are to be transmitted to a common remote unit, wherein the specific common remote side optical output corresponds to the common remote unit, and;

for each remote side optical output:
multiplexing the respective assigned component downlink signals into a combined optical downlink signal; and transmitting the respective combined optical downlink signal to the assigned at least one of the plurality of remote side optical outputs;

receiving, at a plurality of remote side optical inputs, a plurality of optical uplink signals, each optical uplink signal comprising at least one component optical uplink signal, wherein each of the plurality of remote side optical inputs is complementary to a corresponding one of the plurality of remote side optical outputs, and wherein:

at least one optical uplink signal is a combined optical uplink signal comprising a plurality of component optical uplink signals; and at least one combined optical uplink signal comprises at least one uplink RF communication signal and at least one uplink DD signal;

for each remote side optical input, receiving a combined optical uplink signal, separating each combined optical uplink signal into each of the respective component optical uplink signals; and transmitting each component optical uplink signal toward a respective at least one head-end side output.

15. The method of claim 14, wherein combining the component downlink signals into the combined optical downlink signal comprises wave division multiplexing the component downlink signals into the combined optical downlink signal.

16. The method of claim 15, wherein at least some of the plurality of component optical uplink signals are transmitted from respective head-end side outputs to at least one service matrix unit, each service matrix unit receiving at least one uplink RF communication signal and at least one uplink DD signal from at least one respective head-end side output.

17. The method of claim 16, wherein at least some of the plurality of component downlink signals are received at respective head-end side inputs from at least one service matrix unit, each service matrix unit transmitting at least one downlink RF communication signal and at least one downlink DD signal to at least one respective head-end side input.

18. The method of claim 15, wherein at least some of the plurality of component downlink signals are received at respective head-end side inputs from at least one service matrix unit, each service matrix unit transmitting at least one downlink RF communication signal and at least one downlink DD signal to at least one respective head-end side input.

19. The method of claim 14, wherein the plurality of component downlink signals are electrical signals, the method further comprising converting each component downlink signal into a respective component optical downlink signal.

20. The method of claim 14, further comprising converting each component optical uplink signal into a respective component electrical uplink signal and transmitting each respective component electrical uplink signal to the respective at least one head-end side output.

* * * * *

UNITED STATES PATENT AND TRADEMARK OFFICE
CERTIFICATE OF CORRECTION

PATENT NO. : 10,601,511 B2
APPLICATION NO. : 16/000029
DATED : March 24, 2020
INVENTOR(S) : William Patrick Cune et al.

Page 1 of 1

It is certified that error appears in the above-identified patent and that said Letters Patent is hereby corrected as shown below:

In the Claims

In Column 17, Line 22 approx., Claim 1, delete "(DD" and insert -- DD --, therefor.

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*